(12) United States Patent
Mashayekhi et al.

(10) Patent No.: US 7,254,740 B2
(45) Date of Patent: Aug. 7, 2007

(54) SYSTEM AND METHOD FOR STATE PRESERVATION IN A STRETCH CLUSTER

(75) Inventors: Victor V. Mashayekhi, Round Rock, TX (US); Tau Leng, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 11/157,067

(22) Filed: Jun. 20, 2005

(65) Prior Publication Data
US 2005/0240564 A1 Oct. 27, 2005

Related U.S. Application Data

(63) Continuation of application No. 09/978,239, filed on Oct. 15, 2001, now Pat. No. 6,910,150.

(51) Int. Cl.
*G06F 11/00* (2006.01)
(52) U.S. Cl. .............................. 714/4; 714/6
(58) Field of Classification Search .................. 714/4, 714/6; 709/246; 707/204
See application file for complete search history.

(56) References Cited

U.S. PATENT DOCUMENTS

| | | | | |
|---|---|---|---|---|
| 6,396,391 B1 * | 5/2002 | Binder | ................... | 340/538.15 |
| 6,990,603 B2 * | 1/2006 | Strasser | ........................ | 714/6 |
| 7,028,220 B2 * | 4/2006 | Park | ........................... | 714/22 |
| 7,117,320 B2 * | 10/2006 | Ashmore et al. | ........... | 711/156 |

* cited by examiner

*Primary Examiner*—Robert W. Beausoliel, Jr.
*Assistant Examiner*—Christopher McCarthy
(74) *Attorney, Agent, or Firm*—Baker Botts L.L.P.

(57) ABSTRACT

A system and method for preserving the data content of a network having a cluster is provided in which each of the network interface controllers of the servers of the cluster includes a copy of a set of data. Each of the network interface controllers includes a local power source, local memory, and an operating system, allowing the network interface controllers to remain in communication despite a failure to one or both of the associated servers. The data may be operational data that is critical to the operation of the cluster system. Alterations to the set of data can only be made by a write operation that is logically atomic or indivisible. Incomplete write operations are discarded unless a successful write operation is performed to both servers.

11 Claims, 3 Drawing Sheets

SYSTEM AND METHOD FOR STATE PRESERVATION IN A STRETCH CLUSTER

CROSS-REFERENCE TO RELATED APPLICATION

This application is a continuation of application Ser. No. 09/978,239, filed Oct. 15, 2001, now U.S. Pat. No. 6,910,150 which is incorporated herein by reference.

TECHNICAL FIELD

The present disclosure relates generally to the field of computer networks and, more specifically, to a system and method for operating a cluster to preserve data in the event of an operational loss to a member server of the cluster.

BACKGROUND

A cluster is a group of individual servers managed through software as a single system. One example of a cluster is a group of two physical servers coupled to one another through a shared cable for the purpose of internode communications. The management of several servers as a single unit improves the availability, manageability, and scalability of the group of servers. In terms of availability, the use of a cluster improves the availability of services or applications by providing a failure recovery mechanism to insure that applications and services continue to operate despite a hardware, operating system, service, or application failure.

A cluster may be used to serve data storage resources. In one configuration, each server of a two-node cluster is coupled to the storage resources of the cluster system. Included in the storage resources of the cluster system are the data of the applications running on the cluster and the metadata of the cluster. Metadata is data concerning, describing, or defining other data. The combination of the data and the metadata of the cluster defines the state or global state of the cluster. The metadata of the cluster includes information describing the logical relationship of servers in the cluster and their association with the services provided by the cluster. Each node of the cluster uses the saved metadata to manage the operation and resources of the cluster system. If the cluster system does not include a shared external storage resource between the nodes of the cluster and if each server maintains a separate copy of the metadata on a storage resource accessible by the server, the cluster may be susceptible to a partition-in-time discontinuity. A partition-in-time discontinuity is a temporal discontinuity in the metadata that occurs following a sequence of failures in the nodes of the stretch cluster.

Assuming that the cluster system does not include a shared external resource between the servers of the stretch cluster, a temporal discontinuity in the metadata occurs when the servers of the cluster fail in the following sequence. At time $T_1$, server A fails. According to the failover protocol of the cluster system, server B immediately assumes the operations of server A, including the task of serving data from storage and updating the metadata stored in the storage resources available to server B. At time $T_2$, before server A is restored, server B fails. At a later time $T_3$, server A is restored at a time when server B is still down. Server A then assumes the operations of server B without the benefit of the metadata that has been altered between time $T_1$ and time $T_3$. As a result, server A is operating on the basis of metadata that has a time stamp immediately prior to time $T_1$. Therefore, the global state of the cluster system may be inconsistent in that the metadata of the cluster is not accurate. The only operating server of the cluster system is operating on the basis of metadata that is outdated and likely inaccurate.

Some cluster systems attempt to solve this temporal discontinuity by including at least one shared storage resource between the servers of the cluster. In this configuration, the shared storage resource is used by the servers for storage of the metadata of the cluster. If the servers of the cluster fail in the sequence outlined above, the metadata of the cluster will remain current as both servers will have access through the shared storage resource to metadata of the cluster system, eliminating the possibility of a temporal discontinuity. One difficulty of a shared storage approach is that shared storage is not possible in the case of remotely located or stretch clusters. The distance between the servers and the shared storage of the cluster system is limited by the maximum effective distance between nodes in the cluster. As such, a shared storage approach is not possible in the case of geographically separate server nodes.

Another approach to avoiding the possibility of a temporal discontinuity in the metadata of the cluster system is to remove from service the operational server when another server of the cluster fails. According to this approach, after failure of server B and the restoration of server A, server A does not provide any services until server B is also restored, and the metadata of the servers is synchronized. The weakness of this approach is that service to clients of the cluster system is not restored until server B is restored, even though server A is restored and can serve the clients that are dependent on the cluster system. This approach diminishes or prevents the high availability of services for clients of the cluster system, which is one of the primary reasons for clustering.

SUMMARY

In accordance with the present disclosure, a system and method is provided for preserving data during the operation of a cluster. According to the technique of the present disclosure, in a cluster having two servers, each of the servers of the cluster includes a network interface controller (NIC). Each network interface controller is intelligent in that each includes a local memory, local power source, and a local operating system, allowing the network interface controller of each server to operate independently of the server. Because of the inherent functionality of the intelligent network interface controllers of the cluster, the intelligent network interface controllers of the cluster are able to communicate with one another despite an operational failure in one or both of the servers of the cluster.

A copy of critical recovery or cluster operational data may be stored in the memory of each of the intelligent network interface controllers. Because this data is maintained locally in the intelligent network interface controllers, the data can be updated despite the failure or loss of one or both of the servers of the cluster. If one of the servers fails, the intelligent network interface controller of the failed server will not automatically fail, allowing the intelligent network interface controllers to continue to communicate with one another to update the data saved locally to the memory of the intelligent network interface controllers. To insure that saved data of the intelligent network interface controllers is identical, the data is saved to the intelligent network interface controllers according to a logically atomic write procedure in which a write operation to the local memories of the intelligent network interface controllers is discarded unless an acknowledgment is received by both intelligent network interface controllers within a defined time period. In this manner, both copies of data on the intelligent network interface controllers are at all times identical.

The method and system disclosed herein are advantageous in that the data integrity of the cluster system can be preserved despite the failure of one or more of the servers of the cluster. Using the system and method of the present disclosure, the data integrity of the cluster's servers would be preserved even if both servers were to fail before the restoration of the first server to fail. In this event, changes made to operational data of the cluster system would be reflected on both servers. Both servers, therefore, will have the same set of operational data upon restoration of the second of the two servers to be restored.

Another technical advantage of the method and system disclosed herein is a cluster that preserves the data integrity of the system despite the geographical separation of the severs of the cluster. Because each server maintains an intelligent network interface controller that includes local memory, local power, and a local operating system, critical network and cluster configuration data may be stored on the servers despite their separation from one another. Moreover, the provision of an update procedure that involves the use of a logically atomic write procedure insures that one of the geographically separate intelligent network interface controllers does not include a set of network critical data that is not a duplicate of the set of network critical data maintained by the other intelligent network interface controller.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
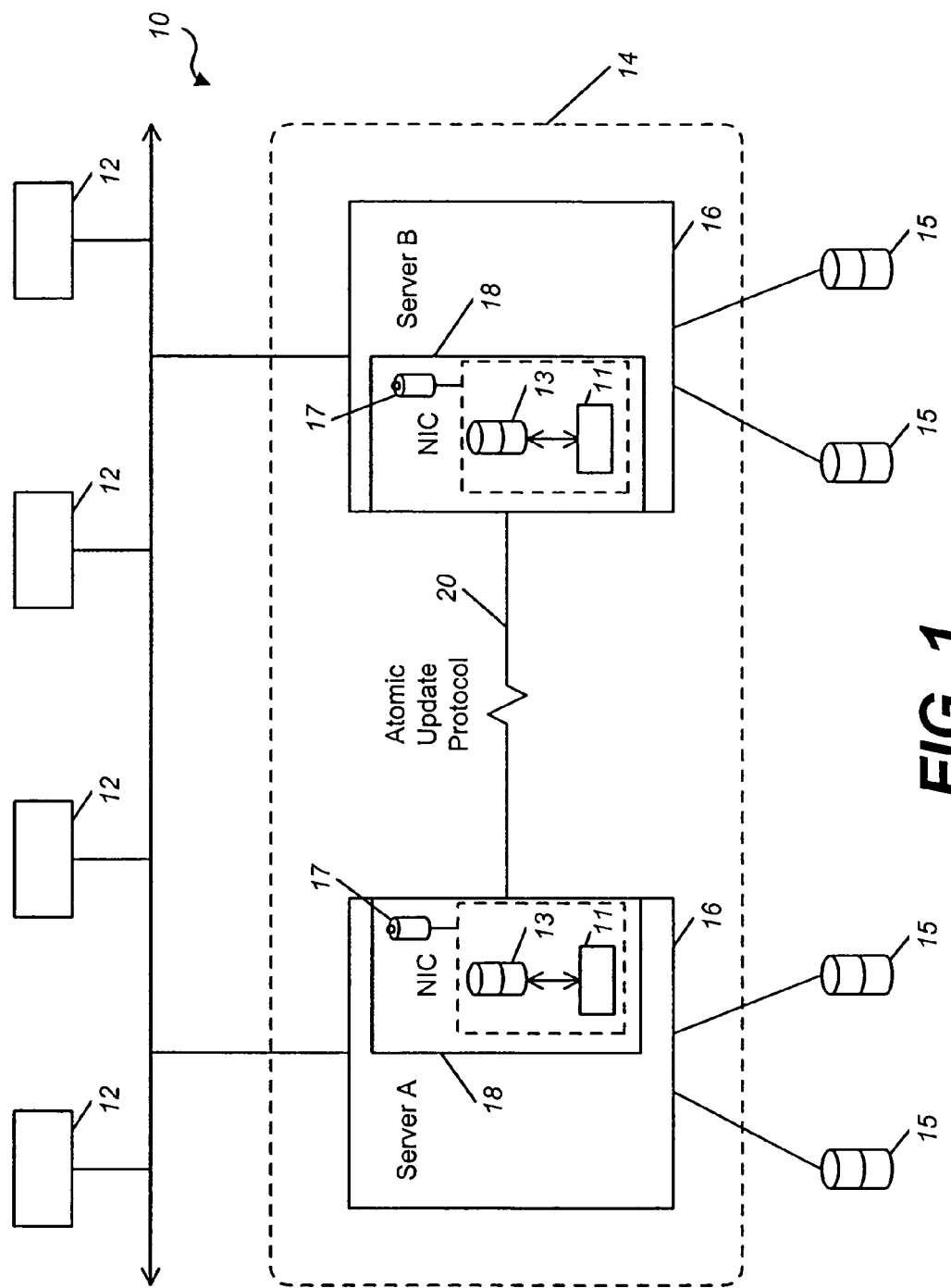
FIG. 1 is a block diagram of an embodiment of a cluster system.

The present disclosure concerns a method and system for avoiding data discontinuities in a cluster. Shown in FIG. 1 is a cluster system, which is indicated generally at 10. Cluster system 10 includes a number of clients 12, a cluster 14, and distributed storage 15. Each server 16 of cluster 14 includes a network interface controller 18. Servers 16 are coupled to one another through network interface controller 18 and a crossover cable 20. Crossover cable may represent a computer network that permits communication between the network interface controllers 18 of each server. Each network interface controller 18 is intelligent in that it includes local operating software and processor 11, local memory 13, and a local power source 17. The operating software and processor 11, local memory 13, and power source 17 of the intelligent network interface controller are independent of servers 16. Power source 17 is described as a local power source because the power source is local to and serves as a backup power source to the processor and memory elements of intelligent network interface controller 18. A complete copy of the metadata of the cluster system is stored in each intelligent network interface controller 18.

Because of the independence of intelligent network interface controllers 18, if one of the servers 16 fails, the operational loss of the server would not automatically cause that server's intelligent network interface controller 18 to fail. The local power source 17 of intelligent network interface controller 18 would allow the controller to remain operational despite a hardware failure, such as a loss of power, in its associated server 16. In addition, because each intelligent network interface controller 18 includes a software operating system 11, the intelligent network interface controller continues to operate even if its associated server 16 suffers a software failure. A copy of the metadata of the cluster system is maintained in the local memory 13 of each intelligent network interface controller 18.

Figure 2:
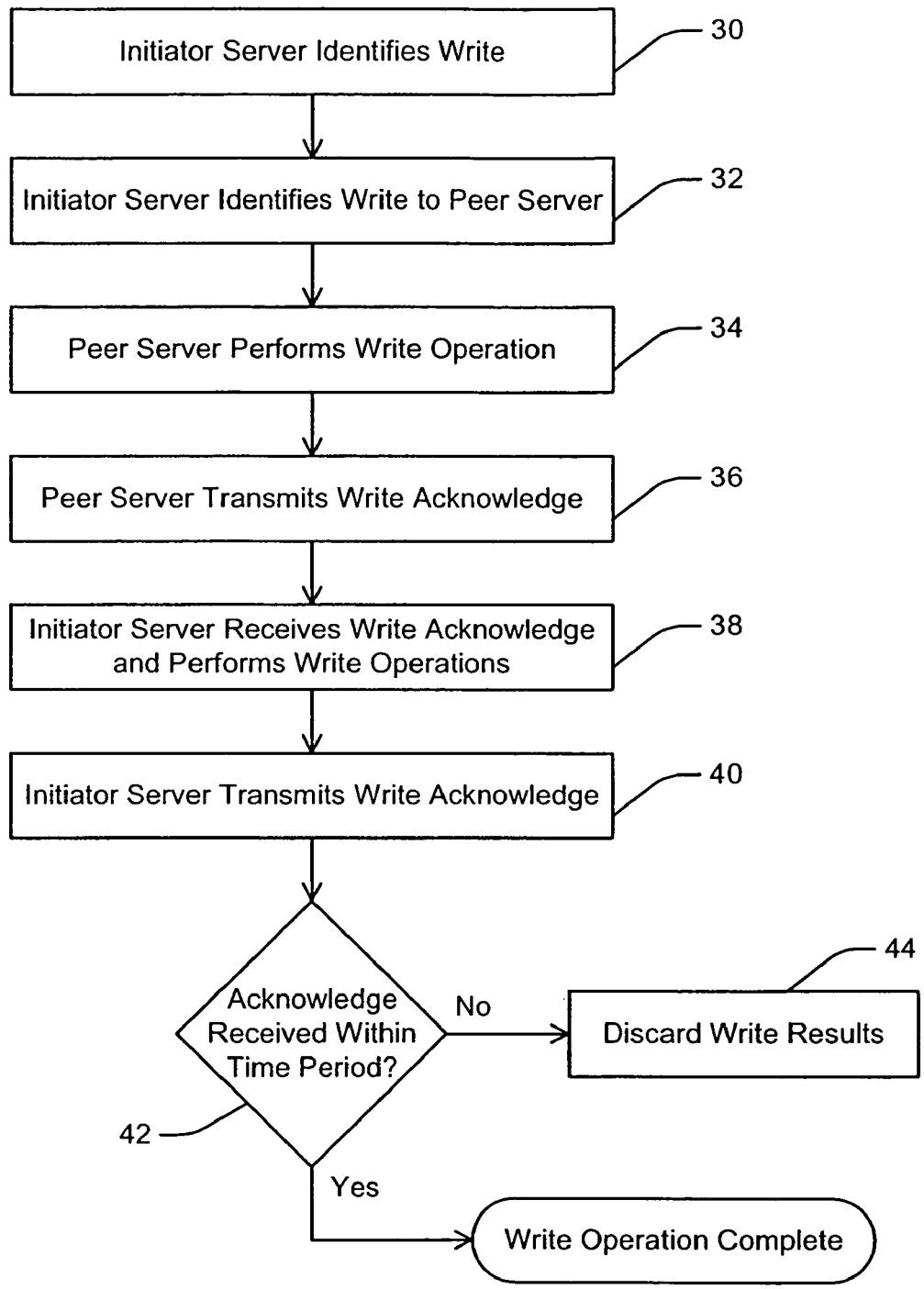
FIG. 2 is a flow diagram of a method for performing a write operation to the metadata of a cluster system.

When the metadata of the cluster system must be changed, such as when writes are made to the cluster logs of the metadata, the write may be performed so that any changes to the metadata stored at one intelligent network interface controller are communicated to the metadata file of the second intelligent network interface controller. As such, the write operation is logically atomic so that changes cannot be made to one intelligent network interface controller without making the same set of changes to the second intelligent network interface controller. The method steps of a write operation are shown in FIG. 2. At step 30, a first server, the initiator server, determines that a write must be made to the metadata of the cluster system. At step 32, the initiator server informs the other server, the peer server, of the write operation and instructs the peer server to perform the write operation to the metadata file of the intelligent network interface controller of the peer server. The peer server performs the write operation at step 34 and delivers an acknowledge message to the initiator server 36. Upon receiving the acknowledge message at the initiator server, the initiator server performs the write operation at step 38 and delivers an acknowledge message to the peer server at step 40. At step 42, it is determined whether the initiator server and the peer server have both received a write acknowledge message.

If either the initiator server or the peer server has not received a write acknowledge message within a time-out period, any writes made to either the initiator server or the peer server as part of the write operation are discarded, as indicated at step 44. Thus, even if a write is made to either the initiator server or the peer server, the write must be discarded unless the write is performed and acknowledged by both servers. In this manner, the write operation to the metadata of each server is logically atomic or logically indivisible. Because the intelligent network interface controller of a failed server continues to operate despite the server failure, logically atomic write operations may continue despite the failure of the associated server of the intelligent network interface controller. It should be noted that all write operations need not be logically atomic. Although logically atomic operations insure that changes to the metadata of a first intelligent network interface controller are also present in a second intelligent network interface controller, the independence of the network interface controllers prevents data discontinuities between the intelligent network interface controllers despite the failure of one or both of the network interface controllers.

Figure 3:
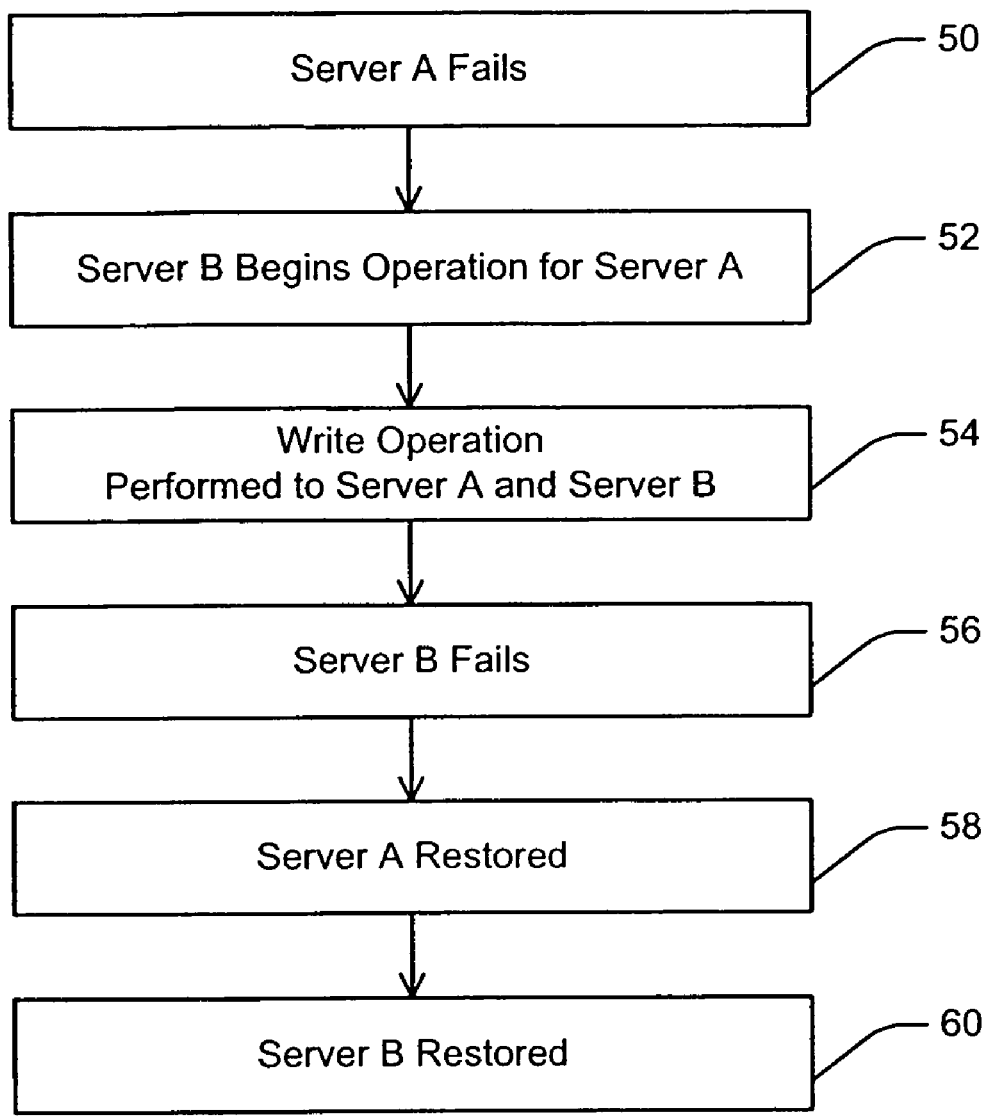
FIG. 3 is a flow diagram of a method for handling a server failure in a cluster system.

Shown in FIG. 3 is a flow diagram of a series of method steps for handling a server failure in a cluster system having the intelligent network interface controller described herein. At step 50, server A fails. Despite the failure of server A, whether because of a hardware failure, such as a power failure, or a software failure, the intelligent network interface controller of server A continues to operate. At step 52, server B begins operations for server A. At step 54, a write operation is performed to the metadata files of server A and server B. At step 56, server B fails. At this point, both server A and server B are not operational, although the intelligent network interface controllers of each server continue to function. At step 58, server A is restored to operation. Because of the metadata stored in intelligent network interface controller of server A is updated, and the status of the metadata saved across the cluster system 10 is consistent, server A can immediately begin providing services to its clients. At step 60, server B is restored. The metadata of the intelligent network interface controllers of the servers is updated. Even though each server suffered an operation loss and changes were made to the metadata of the cluster system during the period that server A was not operational, the metadata available to server A is fully updated at the time that server A is restored to operation.

Although the present disclosures has described servers in a cluster that separated from one another by some geographic distance, the technique of the present may also be used as an alternative to the shared storage scheme that is sometimes used in the case of servers that are not geographically separate from one another. Moreover, although the present disclosure has concerned the case of a cluster having two nodes or servers, the technique of the present invention could also be employed in the case of a cluster of several servers. In this instance, the logically atomic write operation would be performed across all of the servers of the cluster system to atomically update the metadata of the cluster system.

Although the present disclosure has been described in detail, it should be understood that various changes, substitutions, and alterations can be made hereto without departing from the spirit and the scope of the invention as defined by the appended claims.

What is claimed is:

1. A method for updating the content of a set of data accessible by a server of a cluster system, comprising the steps of:
    providing first and second servers;
    providing a network controller associated with each server, each network controller including a local power source and a local memory, wherein the local power source comprises a standby power source operable to provide power to local memory and a processor of the network controller in the event of a power failure in the network controller, and wherein the network controllers associated with each of the first and the second servers are operable to continue to communicate with each other despite an operational failure in at least one of the first server and the second server;
    storing in the local memory of each network controller a copy of a set of data; and
    performing a write operation to the memory of each network controller such that the content of the set of data of each network controller is the same.

2. The method for updating the content of a set of data accessible by a server of a cluster system of claim 1, wherein the first and second servers are geographically separate from one another.

3. The method for updating the content of a set of data accessible by a server of a cluster system of claim 1, wherein the set of data includes the metadata of the cluster system.

4. The method for updating the content of a set of data accessible by a server of a cluster system of claim 1, wherein the step of performing a write operation includes the step of transmitting an acknowledge signal to the other server following the completion of a successful write operation by a server.

5. The method for updating the content of a set of data accessible by a server of a cluster system of claim 4, wherein the write operation is atomic such that the results of the write operation are discarded in the event that an acknowledge signal is not received by each server.

6. The method for updating the content of a set of data accessible by a server of a cluster system of claim 1, wherein each network controller includes a local operating system for controlling communication between the network controllers.

7. A cluster system comprising:
    a first server including a network controller;
    a second server including a network controller;
    wherein the network controllers associated with each of the first and the second servers continue to communicate with each other despite an operational failure in at least one of the first server and the second server;
    wherein the network controller of the first and second servers each include a copy of a set of data describing the status of the cluster system; and
    wherein the network controllers of the first server and the second server are each coupled to a standby power source operable to provide standby power to the network controller such that the set of data is accessible despite the loss of operational power in the associated server and wherein the network controllers associated with each of the first and the second servers are operable to communicate with each other despite an operational failure in at least one of the first server and the second server.

8. The cluster system of claim 7, wherein the first server and the second server are geographically separate from one another.

9. The cluster system of claim 7, wherein each network controller includes a local operating system for controlling communication between the network controllers.

10. The cluster system of claim 7, wherein the set of data is the metadata of the cluster system.

11. The cluster system of claim 7,
    wherein the first server and the second server are geographically separate from one another;
    wherein each network controller includes a local operating system for controlling communication between the network controllers; and
    wherein the set of data is the metadata of the cluster system.

* * * * *